(12) United States Patent  (10) Patent No.: US 8,865,001 B2
Gruett et al.  (45) Date of Patent: Oct. 21, 2014

(54) PROPORTIONAL REGENERATION FOR WATER TREATMENT SYSTEMS

(75) Inventors: Kurt Gruett, Combined Locks, WI (US); Guy Gruett, Neenah, WI (US); Gregory C. Gruett, Lititz, PA (US)

(73) Assignee: Water-Right, Inc., Appleton, WI (US)

( * ) Notice: Subject to any disclaimer, the term of this patent is extended or adjusted under 35 U.S.C. 154(b) by 108 days.

(21) Appl. No.: 13/279,694

(22) Filed: Oct. 24, 2011

(65) Prior Publication Data

US 2013/0098845 A1    Apr. 25, 2013

(51) Int. Cl.
*B01J 49/00* (2006.01)
*C02F 1/42* (2006.01)
*B01D 29/66* (2006.01)
*C02F 1/28* (2006.01)
*C02F 1/00* (2006.01)

(52) U.S. Cl.
CPC . B01D 29/66 (2013.01); C02F 1/42 (2013.01); *C02F 1/28* (2013.01); *C02F 1/001* (2013.01); *C02F 2209/40* (2013.01); *C02F 2303/16* (2013.01); *C02F 2209/44* (2013.01); *C02F 2209/03* (2013.01); C02F 1/008 (2013.01)
USPC ........... 210/741; 210/662; 210/670; 210/739; 210/85; 210/86; 210/89

(58) Field of Classification Search
None
See application file for complete search history.

(56) References Cited

U.S. PATENT DOCUMENTS

| | | |
|---|---|---|
| 3,687,289 A | 8/1972 | Tischler |
| 4,104,158 A | 8/1978 | Davis |
| 4,470,911 A * | 9/1984 | Reinke .......................... 210/662 |
| 4,490,249 A | 12/1984 | Seal |
| 4,668,402 A | 5/1987 | Norton |
| 4,722,797 A | 2/1988 | Gauer et al. |
| 4,990,245 A | 2/1991 | Wieme |
| 5,022,994 A | 6/1991 | Avery et al. |
| 5,060,167 A | 10/1991 | Ticcioni et al. |
| 5,234,601 A * | 8/1993 | Janke et al. ................... 210/662 |
| 5,351,199 A | 9/1994 | Ticcioni et al. |
| 5,751,598 A | 5/1998 | Zabinski et al. |
| 6,206,042 B1 | 3/2001 | Channell et al. |
| 6,214,214 B1 | 4/2001 | Hansen et al. |
| 6,235,200 B1 | 5/2001 | Mace |
| 6,444,127 B1 | 9/2002 | Vaughan et al. |
| 6,790,362 B2 | 9/2004 | FitzGerald et al. |
| 6,814,872 B2 | 11/2004 | Rawson |
| 6,926,821 B2 | 8/2005 | Giordano et al. |

(Continued)

FOREIGN PATENT DOCUMENTS

WO     WO 97/30943    8/1997

OTHER PUBLICATIONS

Webpage, www.rainsoft.com, RainSoft EC4 Series Water Conditioner Systems for Home Use, Dated Jul. 20, 2011, 1 page.

(Continued)

*Primary Examiner* — Dirk Bass
*Assistant Examiner* — Hayden Brewster
(74) *Attorney, Agent, or Firm* — Ryan Kromholz & Manion, S.C.

(57) ABSTRACT

A method for fluid treatment that provides variable or alternative regeneration cycles within the same fluid treatment device. The duration of all stages of the regeneration cycle can be adjusted depending upon the amount of fluid treated so that regenerant resources such as water are not underutilized and waste is not discharged unnecessarily into the environment.

24 Claims, 15 Drawing Sheets

(56) References Cited

U.S. PATENT DOCUMENTS

| | | |
|---|---|---|
| 6,926,835 B2 | 8/2005 | Iizuka et al. |
| 7,338,595 B2 | 3/2008 | VanNewenhizen et al. |
| 7,556,738 B2 | 7/2009 | Premathilake et al. |
| 7,608,183 B2 | 10/2009 | Lillback |
| 7,966,097 B2 | 6/2011 | Zimmerman |
| 2006/0266710 A1 | 11/2006 | Premathilake et al. |
| 2007/0262024 A1* | 11/2007 | Gruett et al. .................. 210/670 |
| 2010/0222928 A1 | 9/2010 | Jeong |

OTHER PUBLICATIONS

Webpage, www.aquadialwaterfilters.co.uk, Aquadial PWebrismertec II Water Softener, Dated Jul. 20, 2011, 3 pages.

Webpage, www.pegasuswater.com, Water Softeners, Dated Jul. 20, 2011, 2 pages.

Webpage, www.dulcosoft.com, DULCO-SOFT DMEa WZT triplex volume controlled water softeners, Dated Jul. 20, 2011, 2 pages.

Webpage, www.hellenbrand.com; ProMate 6.0 Water Conditioning System, Dated 2007-2010, 4 pages.

* cited by examiner

SERVICE

BACKWASH

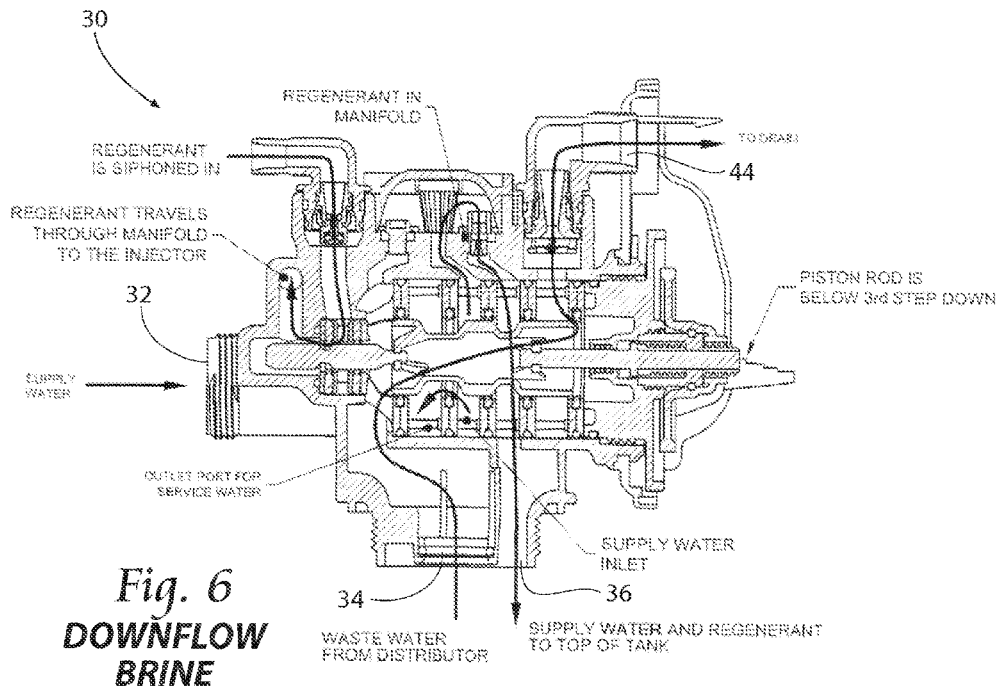
Fig. 6 DOWNFLOW BRINE
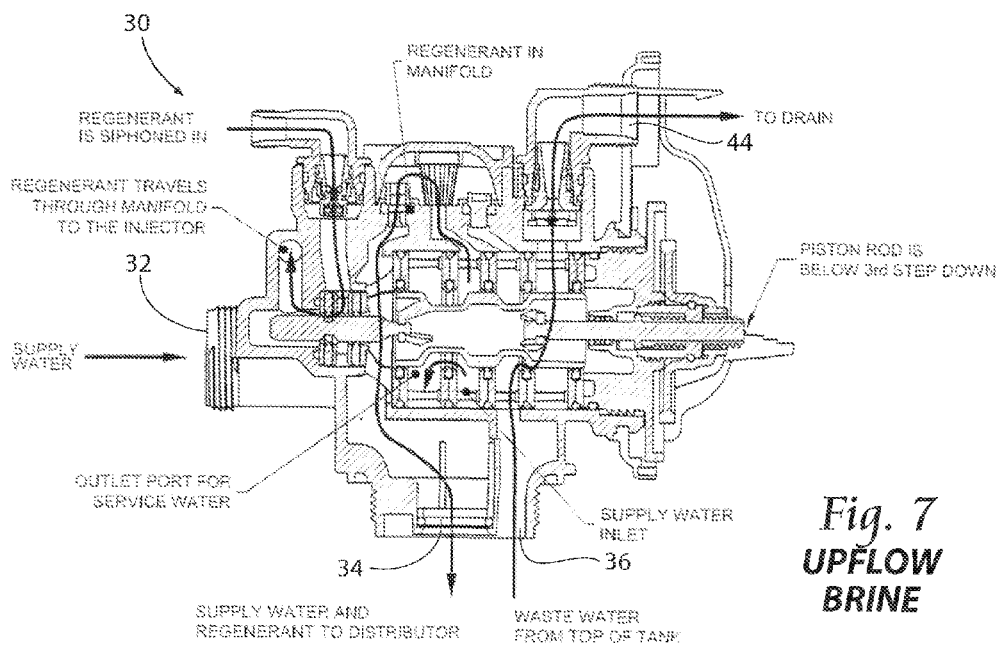
Fig. 7 UPFLOW BRINE

RINSE

FILL

PROPORTIONAL REGENERATION FOR WATER TREATMENT SYSTEMS

BACKGROUND OF THE INVENTION

The present invention relates to methods for fluid treatment that use ion exchange processes or filtering processes to treat the fluids. In particular, the present invention relates to methods and systems that may provide alternate or modified exchange processes within the same system. The alternate or modified exchange processes are a function of past use, predicted future use and/or system load factors.

Fluid filtering and fluid softening processes are becoming more and more common processes and are used in all different situations and environments, from industrial and municipal installations, to individual water filtration systems for homes and houses. Many of the softening fluid treatment processes are ion exchange processes that regenerate ion exchange media and media beds used during the fluid treatment. Regeneration fluids are passed through the bed of depleted ion exchange media during which ions are exchanged between the regenerate solution and the depleted media. In the case of filter media, regeneration fluids are passed through filter media to precipitate the contaminants or to filter out turbidity. As used herein, the terms "ion exchange media" and/or "filter media" and/or "media" are defined broadly to include, as examples, resins, and zeolites, natural and synthetic types of both, carbon and activated carbon, activated alumina, and any other amorphous or microcrystalline structures commonly used in exchange and/or filtering processes. Regenerates for the ion exchange media also cover a broad spectrum of compounds, including potassium permanganate, potassium chloride, hydrogen peroxide, sodium chloride, or any other chemical or compound used to recharge, reactivate, oxidize, or rejuvenate a material bed. A common ion exchange media includes high capacity ion exchange resin.

Current processes and systems allow for basic programming of a regeneration cycle to be undertaken during an ion exchange or media regeneration process. Generally, a regeneration cycle will include one or more steps of backwashing the ion exchange or filter media, regenerating the media, rinsing the media, and servicing the media. Current systems and devices allow for individual cycles to be programmed into the system or device.

It is known in the art that the duration of the regenerating step or brining step may be modified in an ion exchange device such as a water softener. For example, U.S. Pat. No. 4,722,797 (Gauer et al.) discloses a method and apparatus for selecting the quantity of salt to be used during each regeneration of a water softener system. Similarly, U.S. Pat. No. 7,556,738 (Premathilake et al.) discloses an alternate method of measuring the strength of the regenerant or brine (salt) solution during service and measuring the strength again during regeneration is disclosed. In both prior art patents, the disclosed methods maximize the efficient use of salt during regeneration step.

However, there are no known devices in the prior art that allow for alternate or modified regeneration cycles to be programmed and operated within a water treatment system, and especially within a residential treatment system. Such a method and system will save resources, such as water. For example, if a regeneration cycle is needed before the capacity of the system has been depleted, the present system will modify steps of the regeneration cycle including the steps of backwashing the ion exchange or filter media, and rinsing the media to a shorter time period. Alternatively, if the amount of water consumed exceeds the capacity of the system, the present system will modify each step of the regeneration cycle to a longer time period. Such a system, especially for a residential application, would be an advantage over the prior art.

SUMMARY OF THE INVENTION

The present invention provides systems and methods for fluid treatment systems, and specifically water treatment systems, which allow modified and alternative regeneration cycles within the same fluid treatment device. The modified and alternative cycles are dependent upon a measured condition, such as fluid use. Thus, the regeneration sequence may be modified or an alternative regeneration sequence may be used within the same system, which has modified or fixed cycles as compared with a predetermined or "standard" regeneration cycle.

For example, a predetermined or fixed regeneration sequence for a water softener can be programmed to have a backwash cycle, a brine draw and slow rinse cycle, a rapid rinse cycle, and a brine tank refill cycle. A regeneration sequence is typically initiated after a predetermined quantity (e.g. number of gallons) of water has been treated by the system or after a predetermined amount of time has passed since the last regeneration. The system is regenerated after the first of these occurs. Alternatively, a more sophisticated system will track water usage so that the system is regenerated before the predetermined quantity of water is treated. So that the provision of softened water to the distribution system to which the water softener is attached is not disrupted, the system may be programmed to regenerate at night or at a time when water usage is likely to be minimal or not occur.

Depending upon the hardness of the water to be treated, each cycle of regeneration is programmed for a predetermined duration. These parameters are typically established when the treatment system is manufactured. For example, the backwash cycle may have a predetermined time period of 12 minutes, the brine draw and slow rinse cycle may have a predetermined time period of 60 minutes, and the rapid rinse cycle may have a predetermined time period of 8 minutes. With the exception of the brining cycle, the number and durations of these cycles are not changed or modified in prior art systems regardless of whether or not the capacity of the system has been met or not met.

If water consumption is low during the time period between regeneration sequences, running a full regeneration of the treatment system may not be necessary. However, a minimal regeneration may be required. In addition, a full regeneration will waste resources such as water and contribute to excess waste water being dispensed from the system and into the environment. If water consumption is high during the day prior to the night of initiating the regeneration sequence and the capacity of the system is exceeded, a typical full regeneration may not be sufficient to recharge the system. The present invention measures the amount of water or fluid that is treated after the most recent regeneration. When a subsequent regeneration is required by the system and with the exception of brining, the sequence, duration, or number of regeneration cycles may be adjusted according to the actual amount of water treated by the system.

Similar systems and methods may be used with water filtration devices. An acid neutralizer filter typically regenerates using a two stage regeneration process—backwash and rinse. The backwash cycle may last for 20 minutes and the rinse cycle may last for 8 minutes. Similarly, a backwashing carbon filter also utilizes a two stage regeneration process.

The backwash cycle is programmed for 20 minutes and the rinse cycle is programmed for 8 minutes. Again, based on the use or over-use of the system, the present invention provides systems and method for measuring the consumption of water since the last regeneration sequence and then modifying the entire pre-set regeneration sequence depending upon the prior consumption amount.

The specific details of the systems and methods will become clearer through the following drawings and description.

BRIEF DESCRIPTION OF THE DRAWINGS

FIGS. 4-9 provide various exemplary flow patterns through a valve body used in connection with the present invention.

DESCRIPTION OF THE PREFERRED EMBODIMENT

Figure 1A:
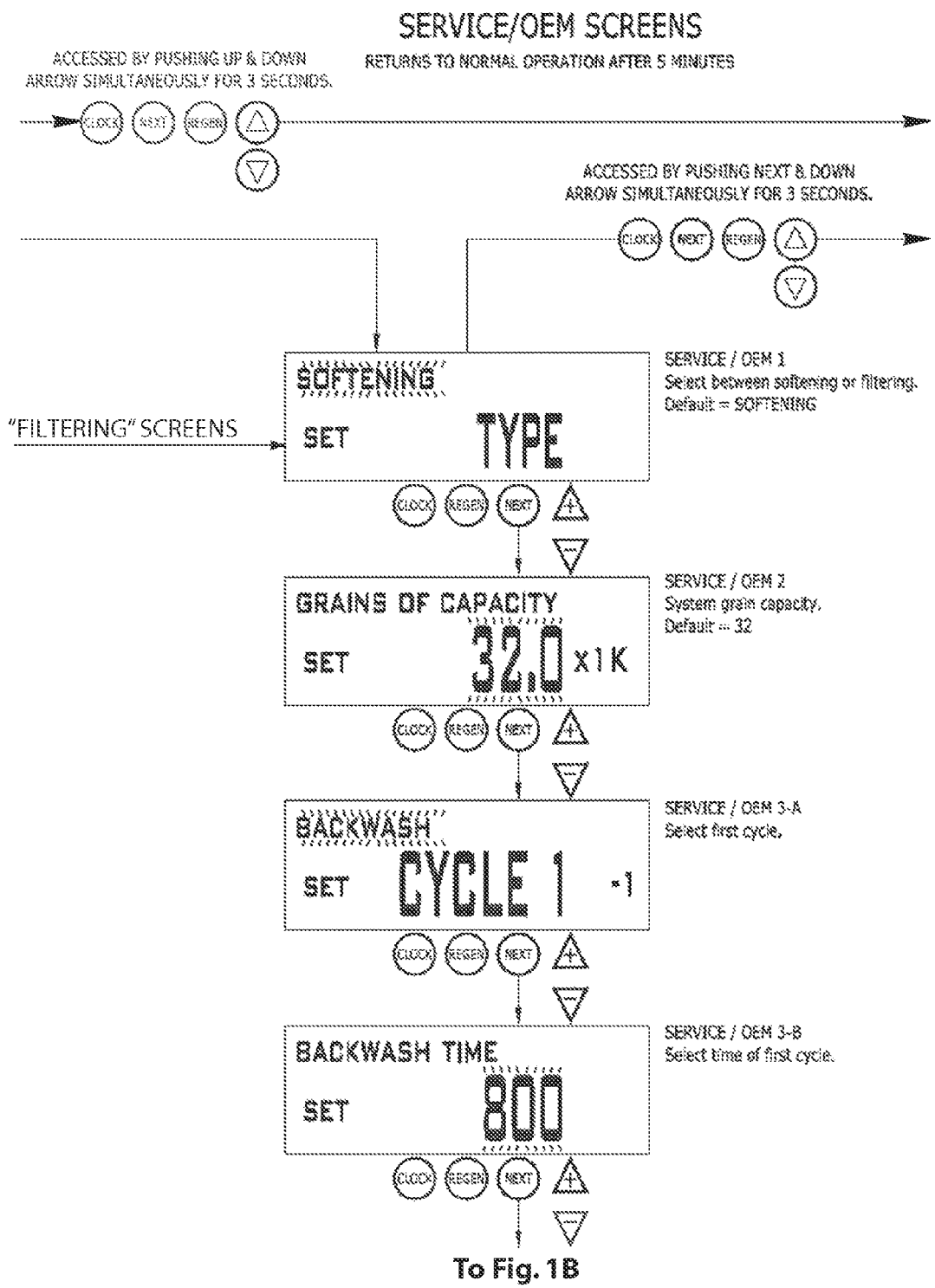
FIG. 1A-1B is a flow chart of the manufacturer setup screens of a regeneration system according to the present invention.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

The present invention provides systems and methods comprising modified regeneration cycling operations for treating and monitoring fluids in a fluid treatment apparatus, such as a water treatment system. The invention allows for modified or alternative regeneration sequences to be incorporated in a single fluid treatment apparatus and method. For instance, the present invention allows a water softening system to adjust some cycles of its regeneration sequence depending upon the actual amount of fluid that has passed through the system. Such a system will minimize the waste of resources.

The water softener system of the present invention employs a method of reducing the regenerate water used in the softener regeneration sequence by adjusting the time, presence, and/or order of regeneration cycles. The adjustments are made based on either time since last regeneration, volume of water treated, a sensor in the system, or other triggering events.

Water softeners or filters have a predetermined capacity and typically regenerate based on a predetermined volume of water used. Since most softeners and filters delay their regeneration until a predetermined no or low water use period, not all capacity is used. Based on this unused capacity, the softener or filter of the present invention will adjust the regeneration cycles either by percentage or a fixed number thus using less water. Softeners often use a "days over ride" feature in conjunction with a meter, sensor, or other triggering device, to trigger a regeneration sequence. If the full capacity of the softener or filter is not used prior to reaching the time limit ("days over ride"), the amount of water treated will be calculated and the device will adjust selected regeneration cycle times either by a percentage or a fixed number.

Water softeners and filters which regenerate based on time (for example every 3 days) may employ a meter or other method to measure the amount of water treated. Given the amount of water treated, the device of the present invention will compute the length of regeneration times based on the actual amount of water treated. A fixed minimum regeneration duration may be employed again depending on the triggering device in the case of no water usage and the triggering event is time. In our preferred embodiment, the regeneration duration would be reduced by no more than 50%. A fixed maximum regeneration length may be employed again based on the triggering event. In our preferred embodiment, the regeneration duration would be increased by no more than 130%.

Example 1

A softener has a rated capacity of 1000 gallons before regeneration is to occur. Because this regeneration is to occur at a non or low use of water time period (for example 2:00 am) the unit will determine if enough water treatment capacity is in reserve to supply the user with treated water through the next day. If insufficient capacity is remaining, the unit will trigger regeneration.

If insufficient treatment capacity is indicated, the unit will regenerate automatically at its predetermined time; however, there may be unused capacity in the system or treatment device. This remaining capacity can be calculated and regeneration times altered based on a percentage of unused capacity. In a system with 1000 Gallons total capacity, the user has treated 800 gallons, and 300 gallons are needed for the next day's water usage, the unit will regenerate because of insufficient capacity remaining. However 200 gallons (1000-800) have not been used. Regeneration could occur with a 20% reduction in time of the regeneration cycles thus saving water.

Conversely if the triggering event for regeneration is amount of water treated and the total capacity of the system is "over run," the unit will make an upward adjustment to the selected regeneration cycles or add additional cycles allowing for a more thorough regeneration.

Example 2

A filter may be programmed to regenerate at a minimum of every three days because of loading factors (pressure drop through system because of iron, manganese, sand, or any other turbidity). Based on the amount of water treated, the unit will compute the proper length of regeneration cycle times. If the 3 days is the triggering event and the total gallons treated is not achieved, the unit's regeneration cycle times will be altered according by percentage. Conversely if the triggering event is consumption (as measured by a meter, sensor, etc.) and the total capacity is "over run," the unit will make an upward adjustment to the regeneration times allowing for a more though regeneration.

Figure 1B:
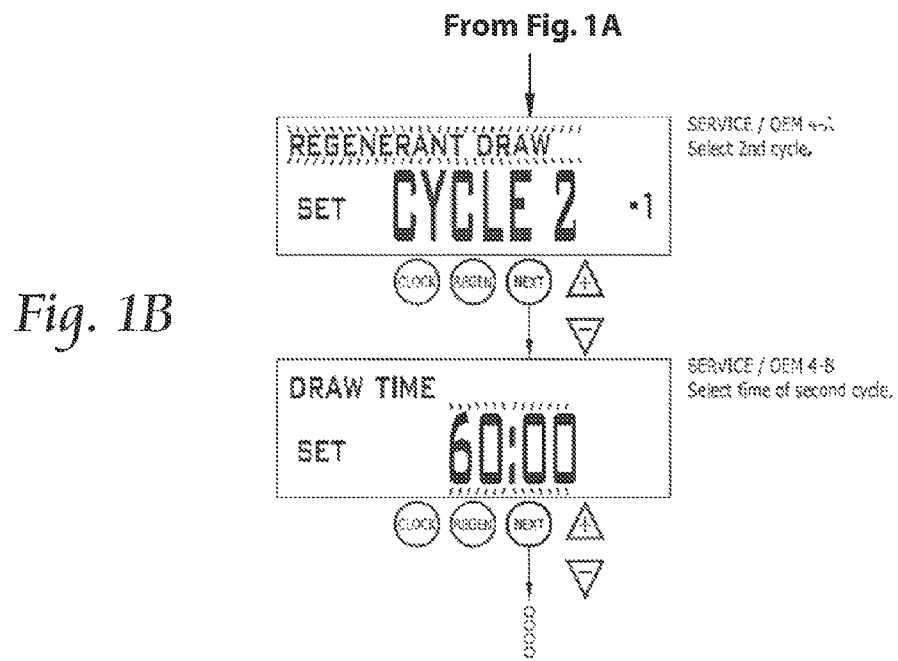

FIG. 1 shows a portion of a general flow chart for a typical program setup for a typical regeneration sequence including cycles 1 and 2. On a typical fluid treatment system that incorporates the present invention, the manufacturer will program the predetermined regeneration cycles. The manufacturer first selects what type of function the unit will perform. The unit is initially programmed to determine which individual cycles or stages will make up the selected regeneration sequence. The manufacturer then enters in the physical capacity of the system. In the case of a water softener, the unit will have a capacity of grains. For example and as shown in FIG. 1A, the unit may have a 32,000 grain capacity. As discussed herein, when the installer enters the hardness of the water to be treated, the capacity of the unit can be calculated. The manufacturer next sets the operating parameters for each of the cycles used in the regeneration sequence, with the duration of operation of each cycle also being entered.

Figure 2:
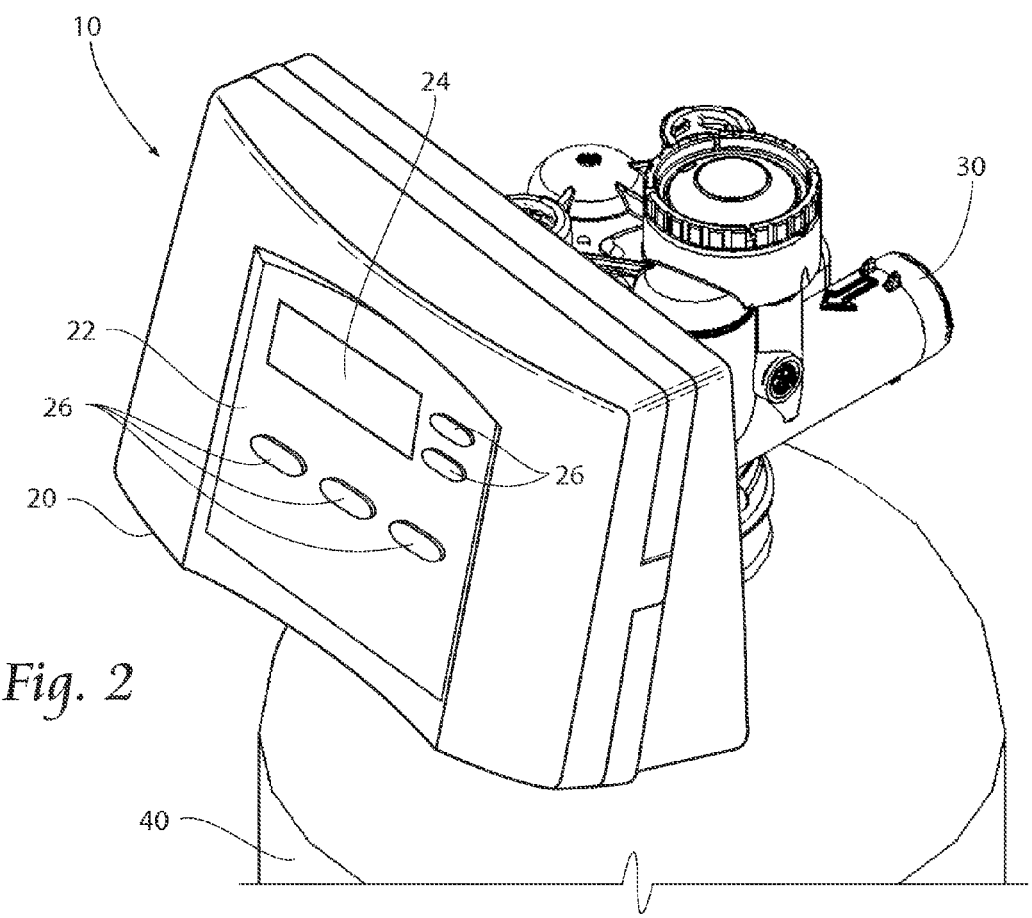
FIG. 2 shows a front perspective view of an apparatus that incorporates the present invention.
Figure 3:
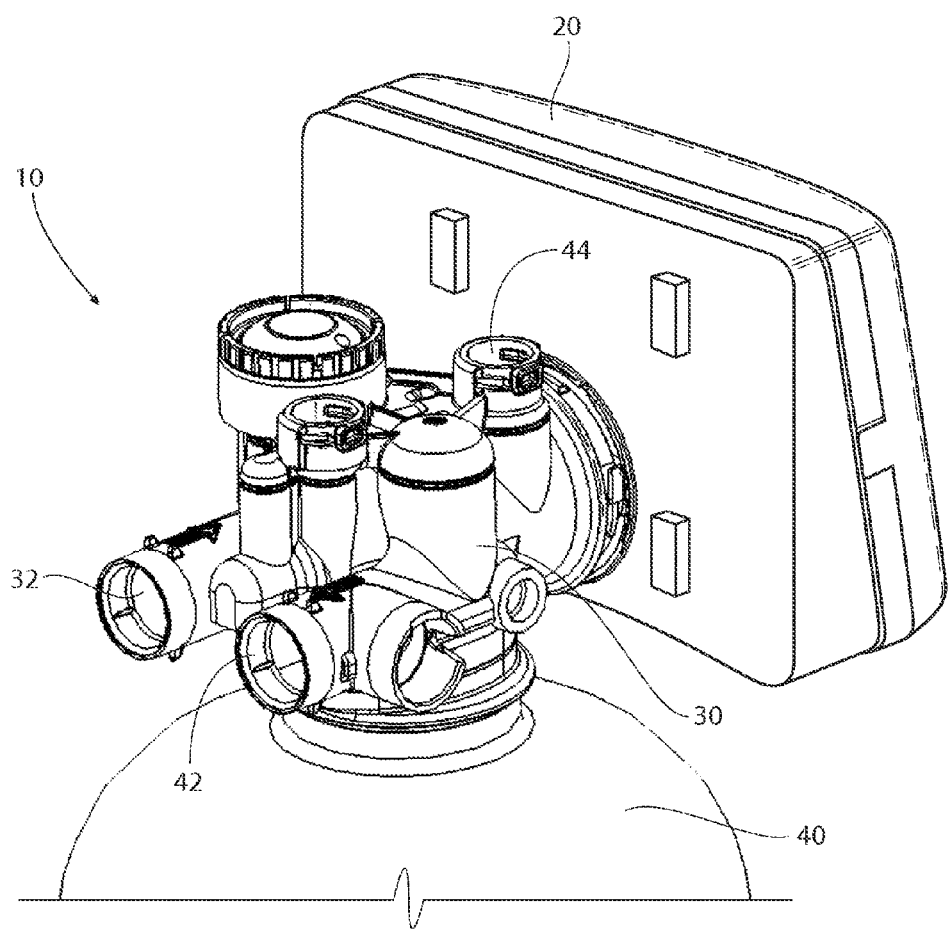
FIG. 3 shows a rear perspective view of the apparatus of FIG. 2.
Figure 4:
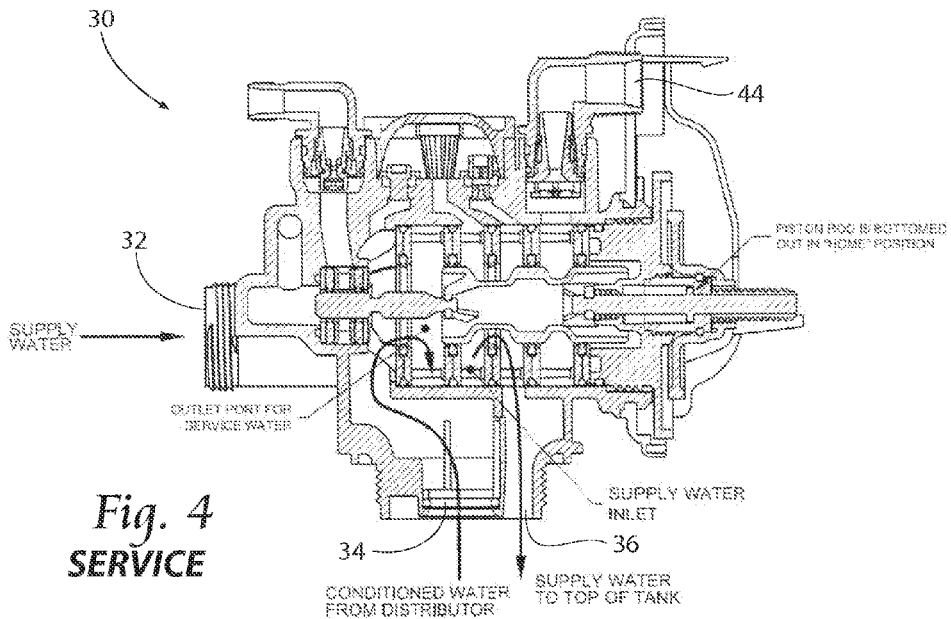
Figure 5:
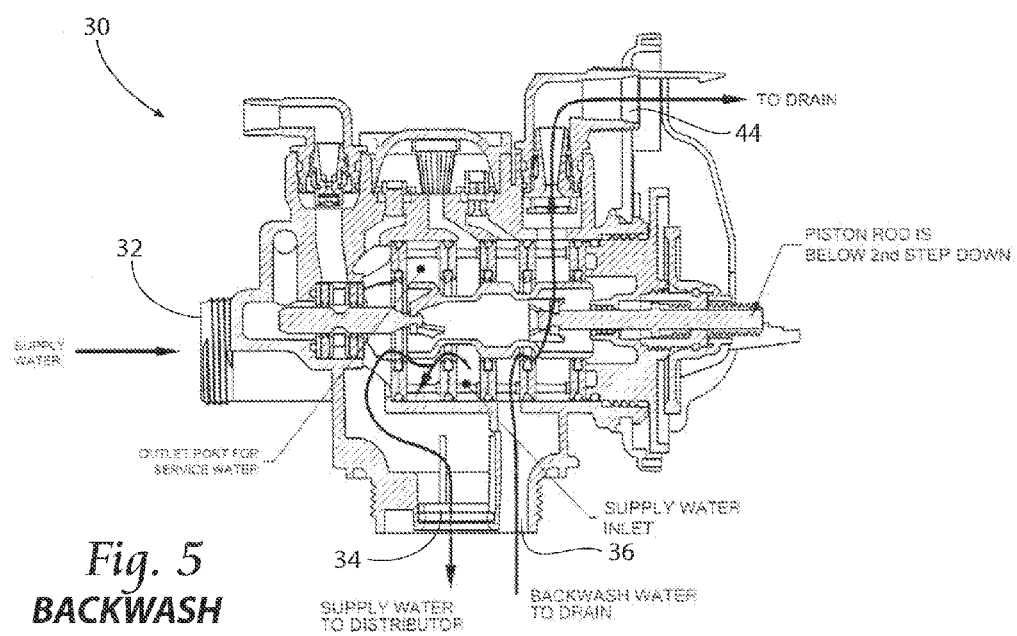
Figure 8:
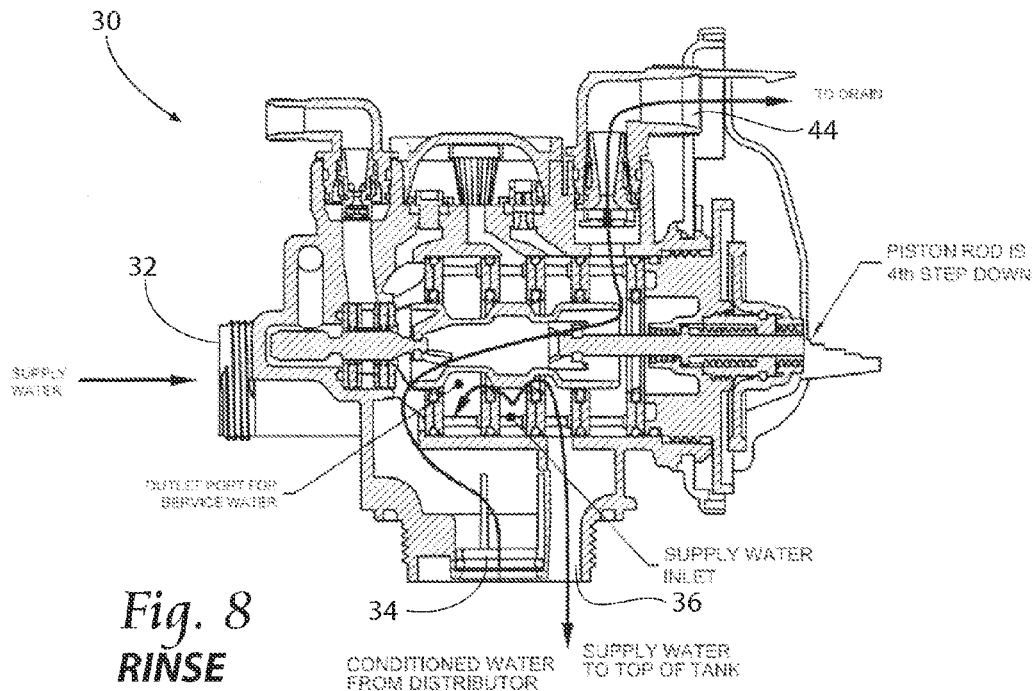
Figure 9:
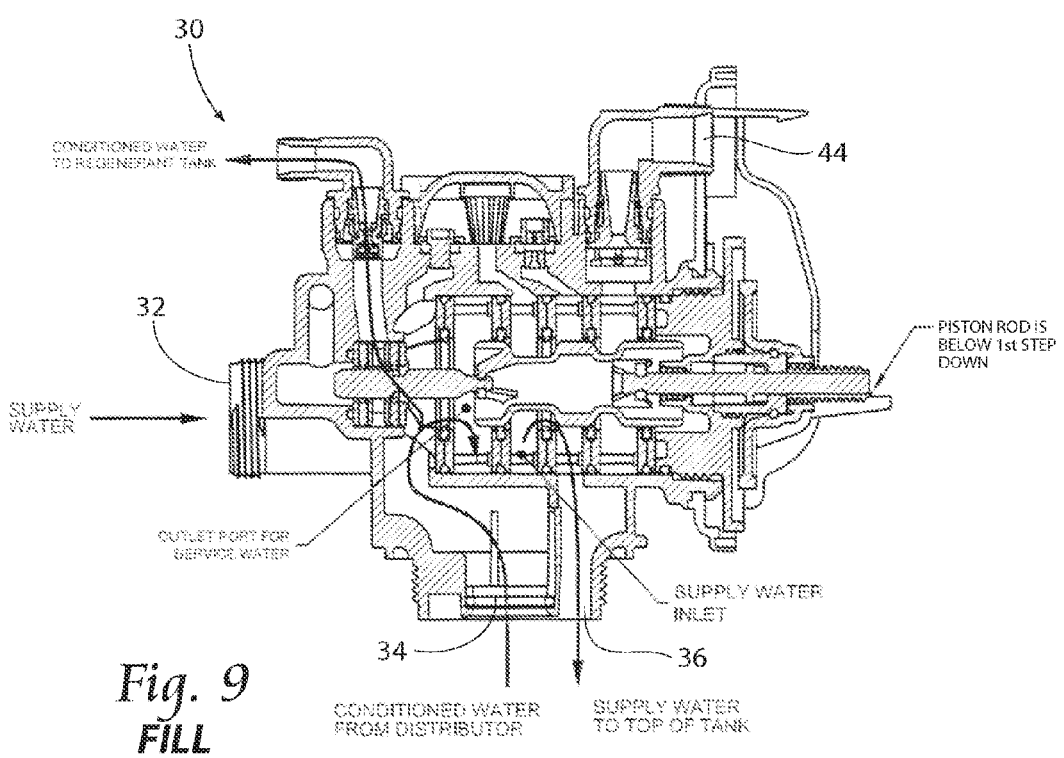

While the present invention may be embodied and employed in any of several fluid treatment apparatuses, examples of apparatuses can be seen in the following drawings. FIGS. 2 and 3 show a water treatment system 10. The system has a programmable controller 20 and valve body 30 that are supported on a treatment reservoir 40. The controller 20 has an interface 22, which provides an area for a display screen output 24, which is capable of displaying the flow chart depicted in FIG. 1. The controller also has various buttons 26 that allow the cycles to be programmed for the system 10.

Exemplary individual cycles are depicted passing through the multiple configurations of the valve body 30 in FIGS. 4-9. FIGS. 4-9 depict cross-sectional views of the valve body 30 performing various cycles or stages that may be carried out within each of the regeneration cycles. The terms used to describe the various cycles, Service (FIG. 4), Backwash (FIG. 5), Downflow Brine (FIG. 6), Upflow Brine (FIG. 7), Rinse (FIG. 8), and Brine Tank Fill (FIG. 9), are common terms used by those having ordinary skill in the art of water treatment and, specifically, water treatment for home and non-industrial water treatment systems. However, it is to be understood that this list is not inclusive and that other cycles or stages could be utilized as well. The valve 30 has a fluid inlet 32, which allows untreated water into the valve body 30 and a fluid outlet 42 for treated water, which is shown in FIG. 3. Inlet/outlet 34 is connected to the reservoir 40 (through a draw tube or pipe not shown) and allows solution to be brought into the valve body 30 and circulated through the valve body 30. An inlet 36 is also connected to the reservoir 40 and allows fluid to flow from the valve body 30, depending on which specific cycle is being performed at a given time. A drain 44 is used for various cycles to purge used or spent fluid from the system. The arrows in the various Figures indicate which of these inlets/outlets will be used for each of the various cycles.

The valve body 30 is best shown in FIGS. 2 and 3. Valve body 30 includes inlets and outlets to connect the system 10 to a water or fluid source, a chemical source and the treatment reservoir, as well as the treated fluid system being fed by the system 10. The valve body 30 is depicted as exemplary of any of several valve body configurations that are known and used in the art and should not be considered limiting to the present invention. The valve body 30 may be modified depending on the specific needs for an individual treatment system. Such valve bodies 30 are capable of regenerating with brine solutions, chlorine, potassium permanganate, hydrogen peroxide and others for use as regenerants in water softening and filtering processes.

Figure 10A:
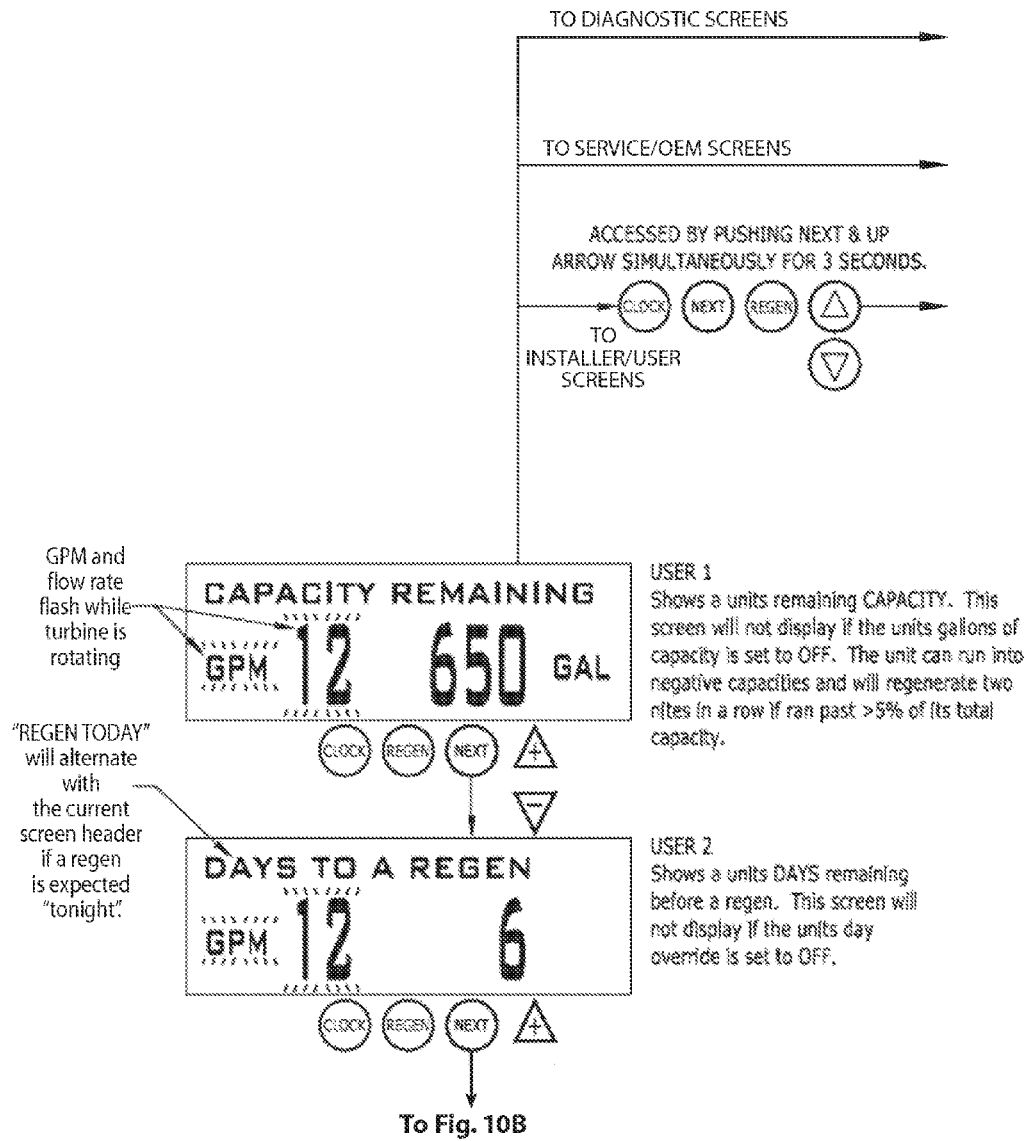
FIG. 10A-10B is a flow chart of the user display screens of a regeneration system according to the present invention.
Figure 10B:
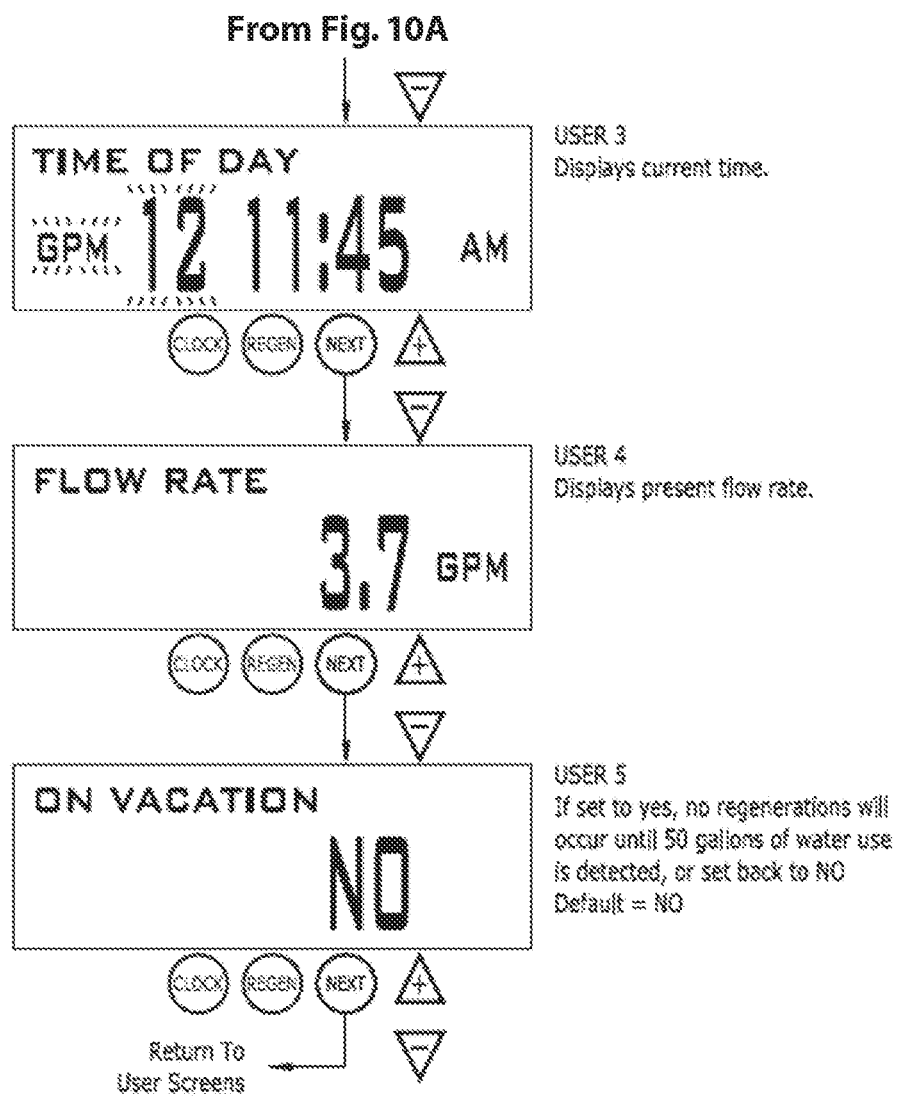

To further explain the invention and to show how it is incorporated into a water treatment device, FIGS. 10 through 13 depict flow charts incorporating various setup and monitoring functions used in connection with the present invention. FIG. 10 depicts various functions that are shown on the display screen 24 during normal operation of the regeneration device. The normal operation screen variables shown include: capacity of the system, predetermined days until a regeneration sequence will occur, flow rates including the current flow rate and the flow rate during regeneration, and time of the day. The normal operation screens also may show default features.

Figure 11A:
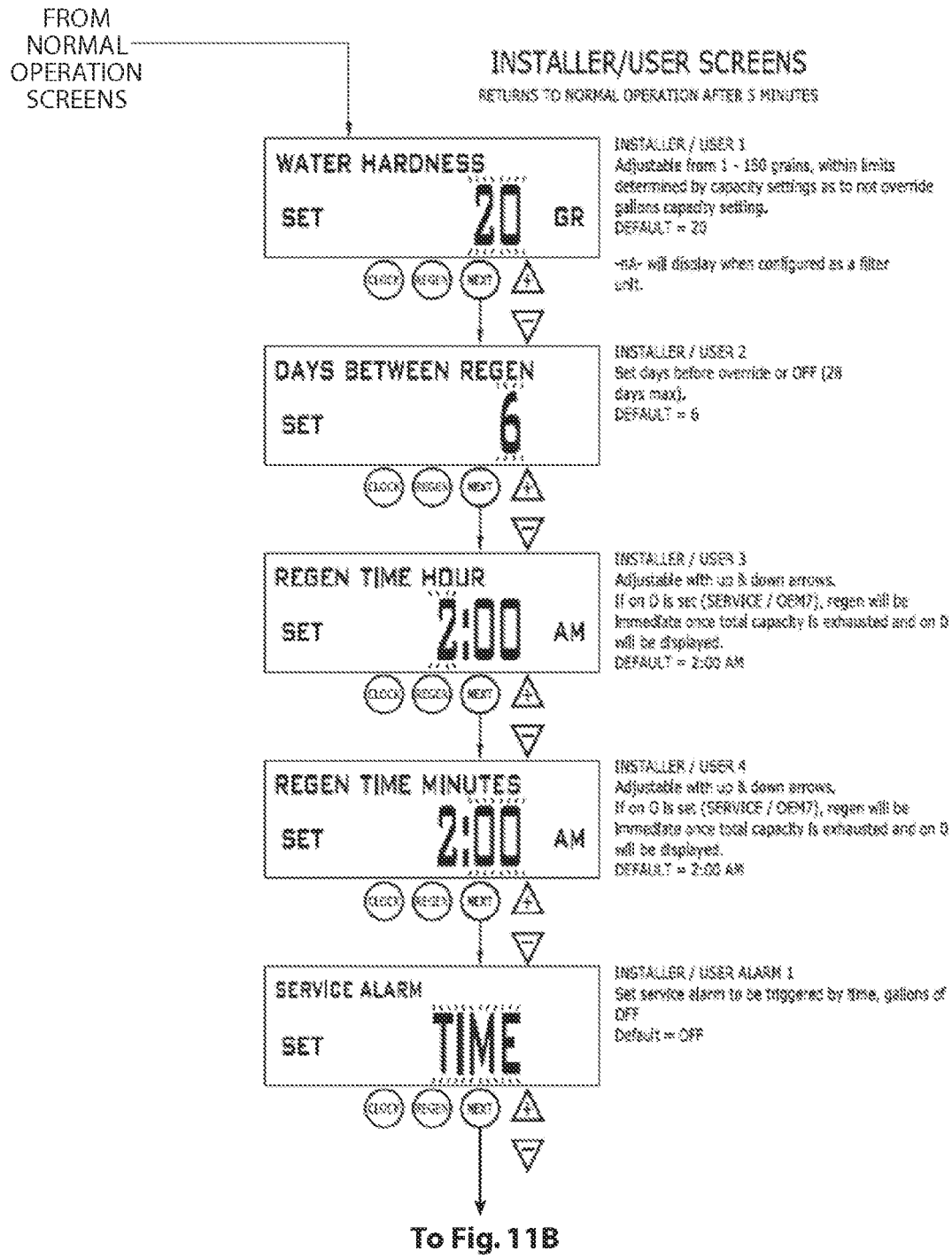
FIG. 11A-11B is a flow chart of the dealer setup display screens of a regeneration system according to the present invention.
Figure 11B:
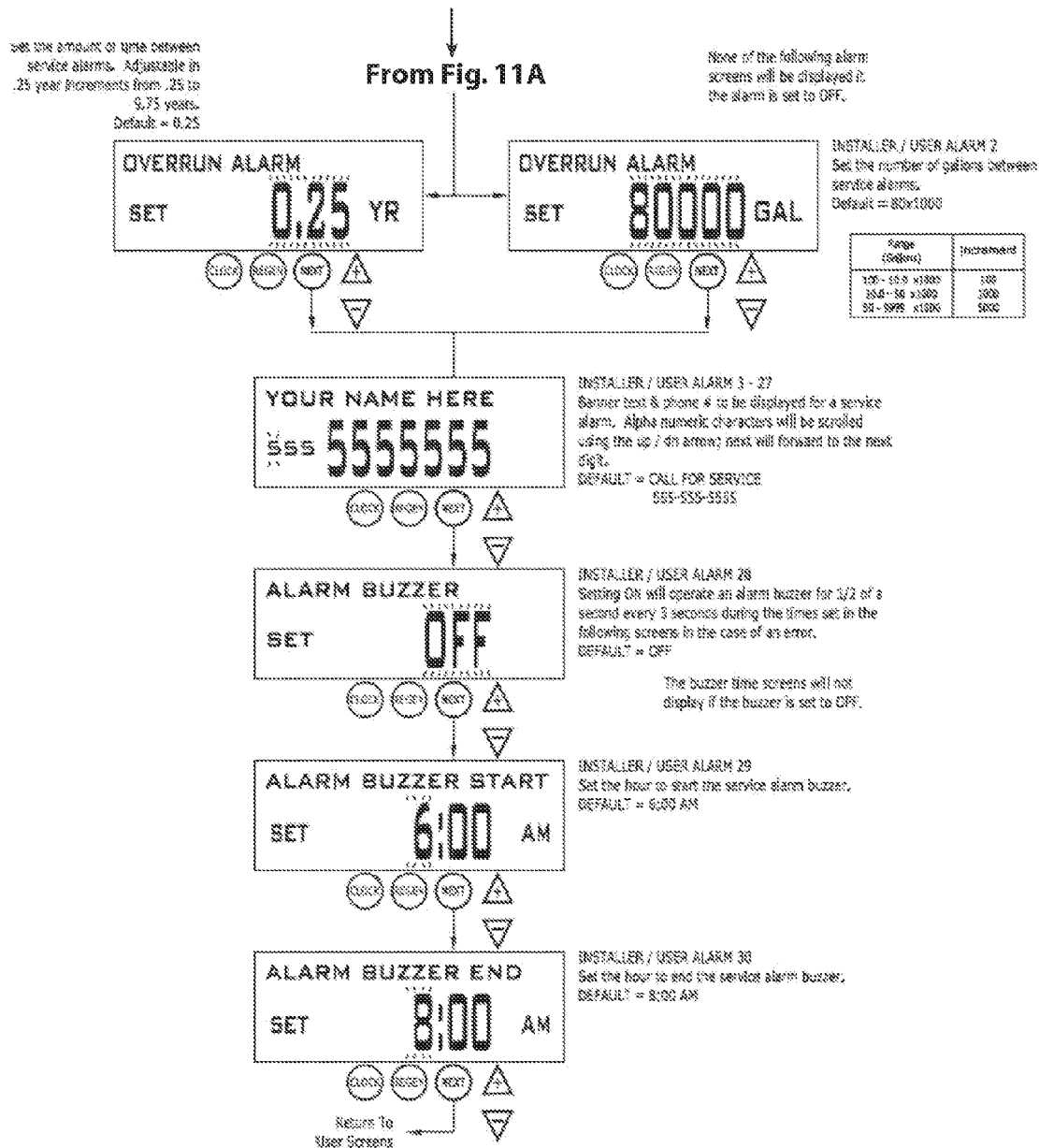

FIG. 11 depicts a flow chart for an installer to set during installation of a water softener. When entering the water hardness in the first depicted screen, the unit computes its capacity by dividing the grains of capacity which is typically set by the manufacturer (32,000 as referred to by example above) by the water hardness. A system with 32,000 grains of capacity divided by a hardness of 20 grains will have a capacity of 1,600 gallons of water. Thus, 1,600 gallons of water can be treated before a full regeneration sequence is required by the system. The manufacturer also typically sets the "days over ride" or maximum days between regeneration shown in the next screen. The installer can adjust the number of days if necessary. The time of day for regeneration to occur, which is ideally at a time of minimal or no water usage, is set by the installer. As further shown, the system also allows for alarms to be activated when service should be performed on the system, with the ability to direct the service to a specific operator or installer of the system, possibly the installer who originally setup the system.

Figure 12:
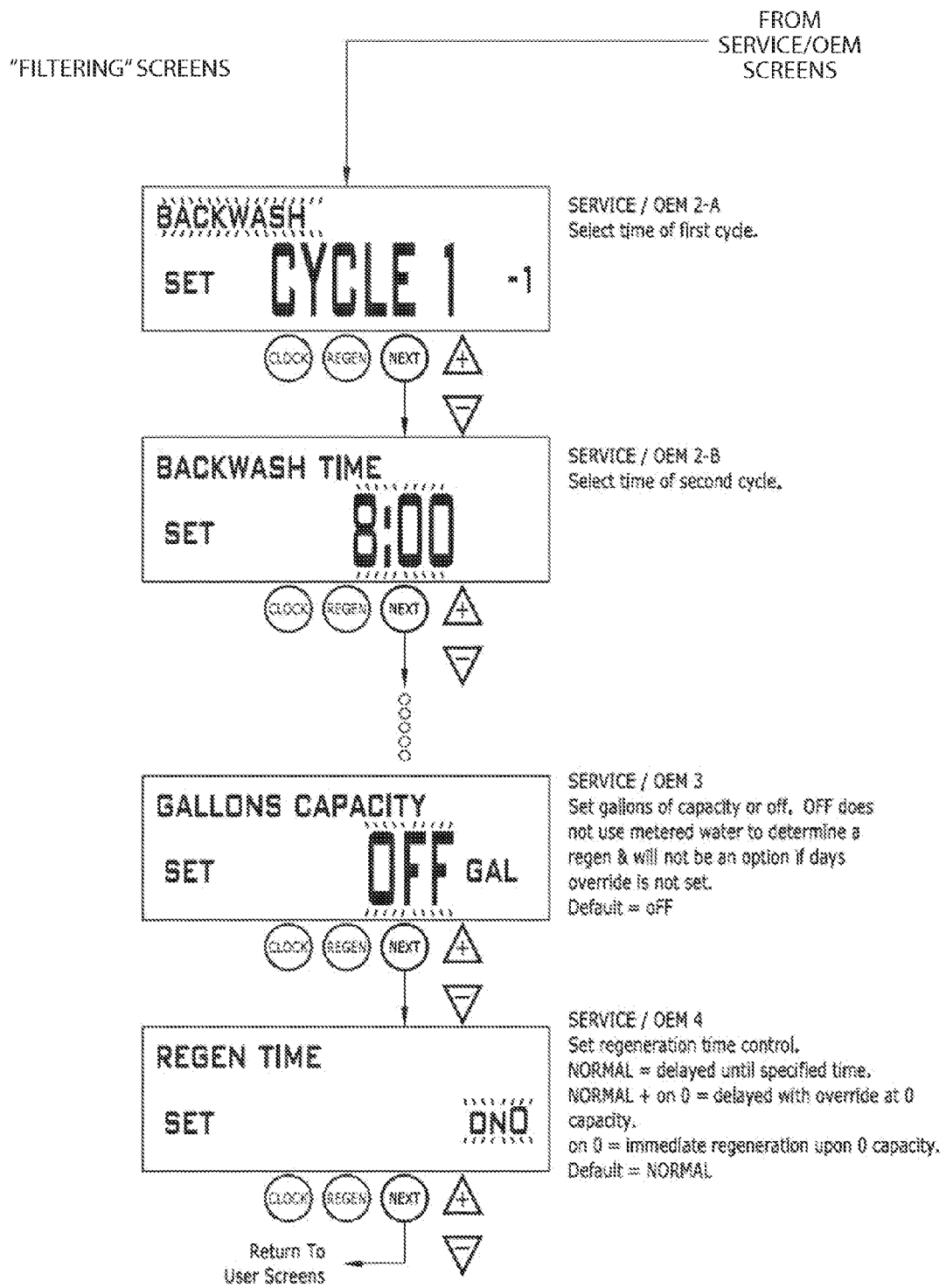
FIG. 12 is a flow chart of the manufacturer program screens of a regeneration system according to the present invention.

FIG. 12 shows a flowchart for a filtering cycle for the present invention as set by the system manufacturer. The flowchart in FIG. 12 will be accessed from the flowchart shown in FIG. 1. Like the softening sequence, the filtering sequence can be set to operate for a predetermined capacity of the system.

Figure 13A:
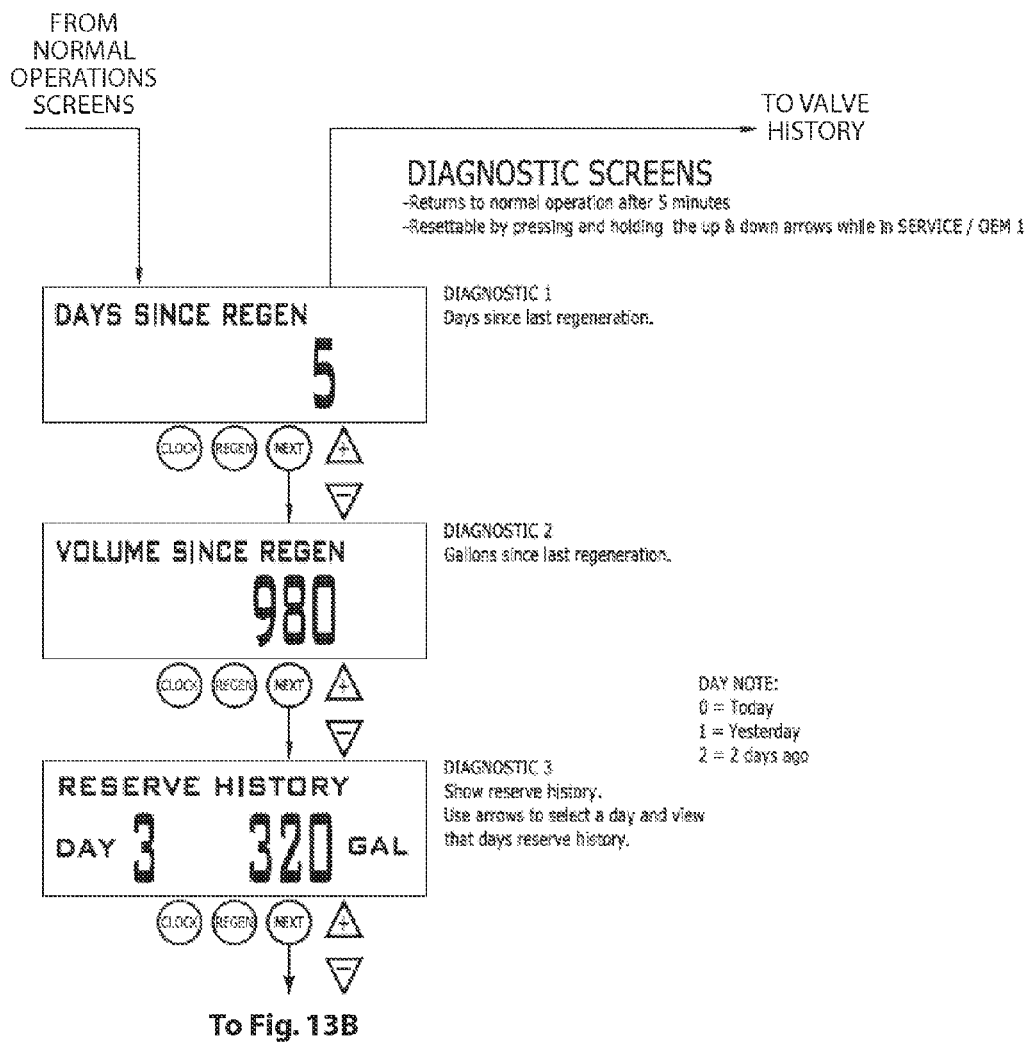
FIG. 13A-13C is a flow chart of the diagnostic screens of a regeneration system according to the present invention.
Figure 13B:
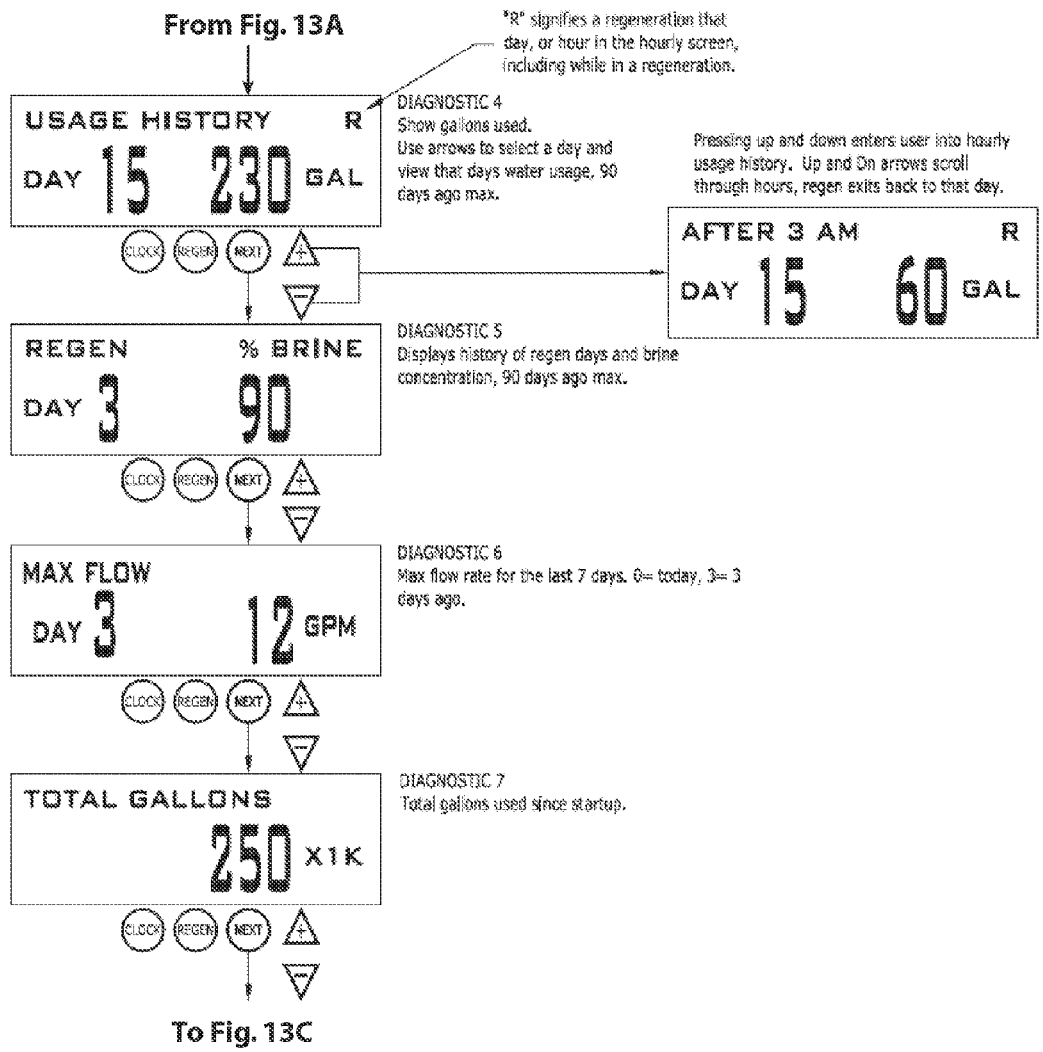
Figure 13C:
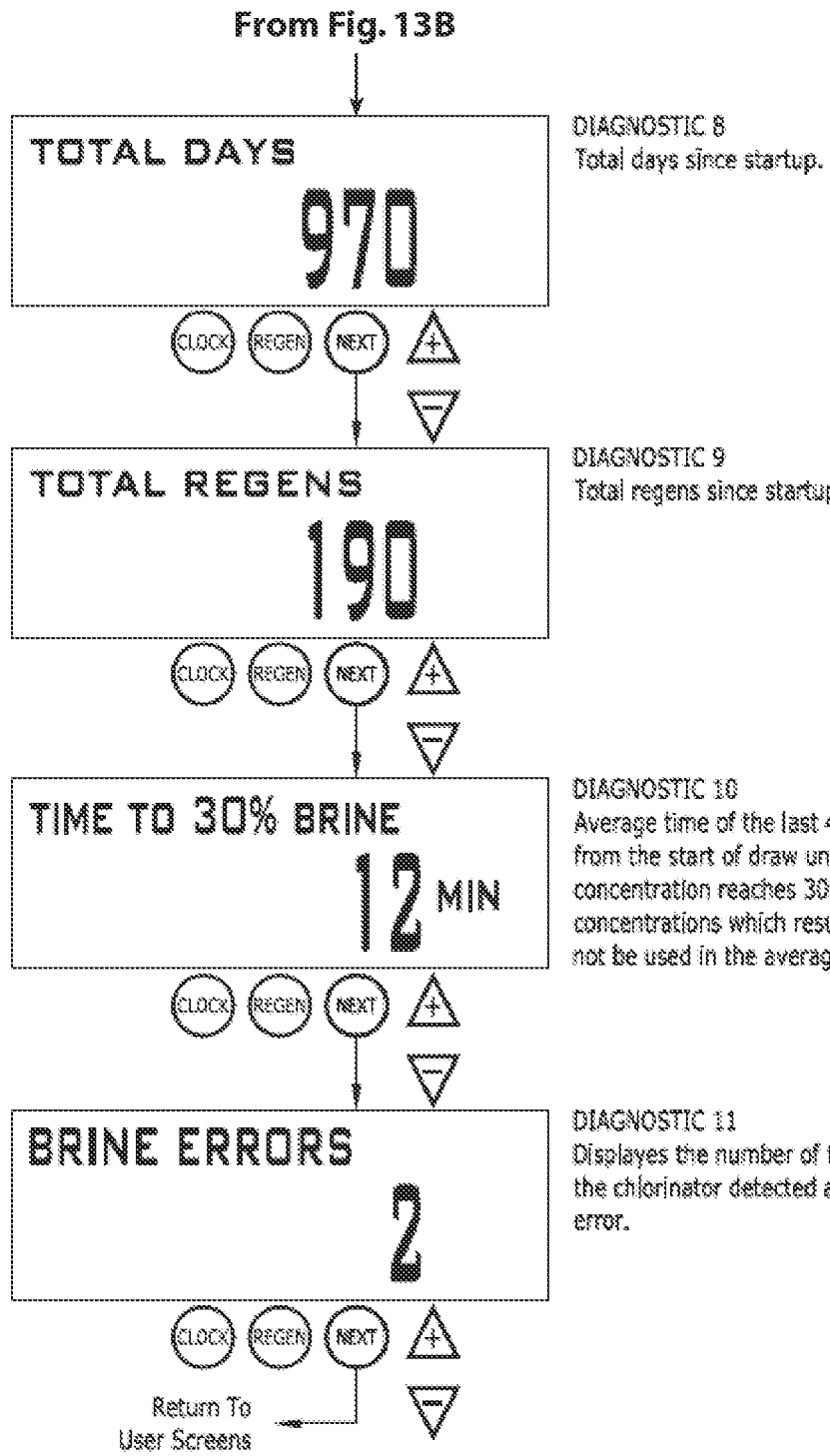

FIG. 13 provides a flowchart depicting various data screens that a service technician can use to perform diagnostic functions on the system. For instance, the volume that has flown through the device since the last regeneration performed, the total amount of time the system has been in operation, or the total volume that has flown through the system since system has been in operation. Such data may be useful in determining whether the system is operating properly or not. The system also has the ability to detect the number of errors that may arise during running of the system, which can be further used by the service technician in assessing reoccurring and/or isolated problems in the system.

Figure 14:
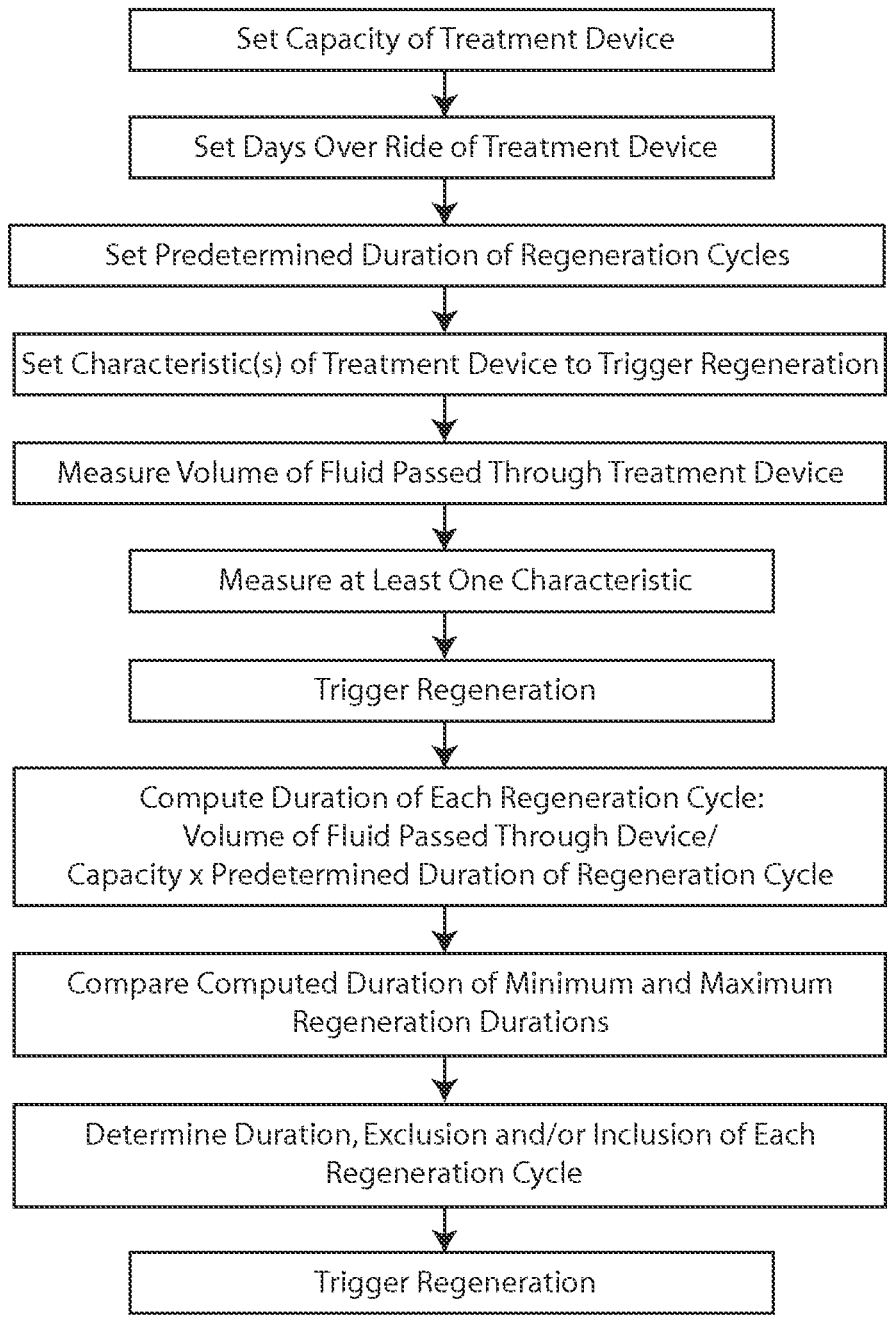
FIG. 14 is a flow chart for the operation of a regeneration system according to the present invention.

FIG. 14 shows a flowchart of the steps utilized by the present invention to modify the duration of each selected regeneration cycle depending upon a measured characteristic of the device such as volume of water treated, time since last regeneration occurred, etc. The steps include providing a water treatment device, setting a predetermined capacity of the treatment device, setting the maximum number of days until regeneration is required ("days over ride"), and setting a predetermined duration for each regeneration cycle. The regeneration cycle has at least one stage such as backwash, down brine, up brine, rinse, and brine tank fill. The next step is setting at least one characteristic of the water treatment device to trigger regeneration. The characteristic can be the volume of water passed through the device as measured by a meter, the time the device has been in operation as measured by a clock, the differential between the pressure of fluid entering the device compared to the pressure of the fluid leaving the system and/or a sensor output. For example a sensor output commonly used in water treatment uses a first probe to measure conductivity of the resin bed in first location and a second probe to measure conductivity in a second location. When a comparison of the probe outputs differs by a predetermined factor, the resin bed needs to be cleaned and regenerated.

The next step is programming the device to initiate a regeneration sequence upon at least one characteristic achieving said setting. As water treatment begins, the device begins measuring at least one characteristic of the water treatment device. This measurement is periodically compared with the programmed predetermined setting to determine whether or not regeneration is required. The volume of water passing through the water treatment device since the prior regeneration is also measured. Once regeneration has been triggered, the duration of each cycle of the regeneration sequence is computed based upon the following formula:

$$(\text{Volume of Fluid Treated}/\text{Capacity of Device}) \times \text{Predetermined Duration of Cycle}$$

Preferably, the duration of each cycle should not be below a pre-set minimum or above a pre-set maximum. For this reason, the computed regeneration duration is compared with the minimum and maximum regeneration durations and the appropriate duration is selected. If the device is programmed to regenerate at a specific time of day or night, the regeneration sequence will not be initiated until that time. Alternatively, the device may calculate its average daily water usage and compare the average daily usage with its remaining capacity to determine when the appropriate day for regeneration is.

Duration is defined as any variable to measure a length or magnitude, such as a volume (gallon, liter), time (hour, day, week) number of cycles (10 cycles, 3 cycles), sensor output, pressure differential or other variable to measure the fluid passing through the system.

In some instances, it may be desirable for the device to add a cycle or to omit a cycle or to change the order of cycles. For example, if water usage has been excessively high, it may be desirable to have two backwash cycles, one before brining and one after brining. Alternatively, if water usage has been quite low, the backwash or rapid rinse cycle or programmed multiples of these cycles may be entirely eliminated during the regeneration sequence.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A method for treating water, said method comprising:
   providing a water treatment device having a programmable controller configured to manage a first regeneration sequence followed by a second regeneration sequence, each of the first and second regeneration sequences comprising one or more correlative regeneration cycles, wherein the controller has been programmed with:
   a predetermined capacity of the treatment device,
   a predetermined time period for the second regeneration sequence to begin,
   a first predetermined duration for each regeneration cycle of the first regeneration sequence, and
   a trigger limit of at least one characteristic of the water treatment device to trigger a regeneration sequence;
   prior to an initiation of the second regeneration sequence, measuring a volume of water passed through the water treatment device since the completion of a prior regeneration sequence;
   initiating with the controller the first regeneration sequence;
   after the first regeneration sequence, programming the controller with a second predetermined duration for each correlative regeneration cycle of the second regeneration sequence, the second predetermined duration of each cycle of the second regeneration sequence being substantially equivalent to the first predetermined duration of the correlative regeneration cycle of the first regeneration sequence multiplied by the measured volume of water divided by the predetermined capacity of the treatment device;
   if at least one characteristic reaches the trigger limit prior to the second predetermined time period, initiating with the controller the second regeneration sequence of the water treatment device prior to the second predetermined time period utilizing the second predetermined duration for each correlative regeneration cycle; and
   if the second predetermined time period occurs prior to at least one characteristic achieving the trigger limit, initiating with the controller the second regeneration sequence of the water treatment device at the second predetermined time period utilizing the second predetermined duration for each correlative regeneration cycle.

2. The method of claim 1 wherein the first regeneration sequence has at least one cycle selected from the group consisting of: backwash, down brine, up brine, rinse, rapid rinse and brine tank fill.

3. The method of claim 1 wherein the at least one characteristic is selected from the group consisting of volume of water passed through the device, time the device has been in operation, ion depletion sensing within the device and pressure differential through the device.

4. The method of claim 1 wherein the second regeneration sequence occurs at a predetermined time.

5. The method of claim 1 wherein the second regeneration sequence occurs during a time period of minimal water use.

6. The method of claim 1 further including the step of, with the controller, automatically computing an average amount of water treated on a predetermined day, computing the remaining capacity of the device by subtracting the measured volume of water passed through the water treatment device since the completion of the first regeneration sequence, comparing the remaining capacity with the average amount of water treated on the predetermined day and initiating the second regeneration sequence if the amount of water treated on the predetermined day exceeds the remaining capacity.

7. The method of claim 1 further including the step of, after the second regeneration sequence, initiating with the controller the first regeneration sequence.

8. The method of claim 1, wherein the second regeneration sequence has more regeneration cycles than the first regeneration sequence.

9. The method of claim 1, wherein the second regeneration sequence has fewer regeneration cycles than the first regeneration sequence.

10. A method for treating water, the method comprising:
    providing a water treatment device having a programmable controller configured to manage regeneration sequences,
    wherein the controller has been programmed with:
    a first predetermined regeneration sequence including one or more regeneration cycles, each cycle having a predetermined duration,
    a capacity for the water treatment device,
    a time period for the first regeneration sequence, and
    a trigger point for at least one characteristic of the water treatment device;
    measuring the amount of water treated by the water treatment device;
    measuring at least one characteristic of the water treatment device;

initiating with the controller the first predetermined regeneration sequence;

after the first predetermined regeneration sequence is complete, computing with the controller the duration of each regeneration cycle of a second regeneration sequence to be substantially equal to the amount of water treated by the device divided by the device capacity, the quotient of which is multiplied by the predetermined duration of a corresponding regeneration cycle of the first regeneration sequence;

if the trigger point occurs prior to the time period, regenerating the water treatment device utilizing the second regeneration sequence upon the occurrence of the trigger point; and if the time period occurs prior to the trigger point, regenerating the water treatment device utilizing the second regeneration sequence at said time period.

11. The method of claim 10 wherein first predetermined regeneration sequence has at least one cycle selected from the group consisting of: backwash, down brine, up brine, rinse, rapid rinse and brine tank fill.

12. The method of claim 10 wherein the characteristic is selected from the group consisting of volume of water passed through the device, time the device has been in operation, ion depletion sensing within the device and pressure differential through the device.

13. The method of claim 10 wherein the second regeneration sequence occurs at a predetermined time.

14. The method of claim 10 wherein the second regeneration sequence occurs during a time period of minimal water use.

15. The method of claim 10 further including the step of, with the controller, automatically computing an average amount of water treated on a predetermined day, computing the remaining capacity of the device by subtracting the measured volume of water passed through the water treatment device since the completion of the first regeneration sequence, comparing the remaining capacity with the average amount of water treated on the predetermined day and triggering the second regeneration sequence if the amount of water treated on the predetermined day exceeds the remaining capacity.

16. The method of claim 10 further including the step of, after the second regeneration sequence, initiating with the controller the first regeneration sequence.

17. The method of claim 10, wherein the second regeneration sequence has more regeneration cycles than the first regeneration sequence.

18. The method of claim 10, wherein the second regeneration sequence has fewer regeneration cycles than the first regeneration sequence.

19. A method of treating a water source, the method comprising the steps of:

providing a water treatment device having a predetermined capacity, the device having a programmable controller configured to manage regeneration sequences, wherein the controller has been programmed with:

a predetermined duration for each cycle of a first regeneration sequence, and a trigger to begin a second regeneration sequence upon the occurrence of a triggering event;

measuring an amount of water treated by the device;

initiating with the controller the first predetermined regeneration sequence;

computing a duration of each regeneration cycle to equal substantially the amount of water treated by the device divided by the capacity of the device multiplied by the predetermined duration of the cycle;

after the first predetermined regeneration sequence is complete, computing with the controller a duration of each regeneration cycle of the second regeneration sequence to be equal to the amount of water treated by the device divided by capacity of the device, the quotient of which is multiplied by the predetermined duration of a corresponding regeneration cycle of the first regeneration sequence; and regenerating said water treatment device utilizing the second regeneration sequence after the occurrence of the triggering event.

20. The method of claim 19 wherein the first regeneration sequence has at least one cycle selected from the group consisting of: backwash, down brine, up brine, rinse, rapid rinse and brine tank fill.

21. The method of claim 19 wherein the triggering event is selected from the group consisting of volume of water passed through the device, a time the device has been in operation, a sensor output and a fluid pressure differential in the device.

22. The method of claim 19 wherein said plurality of triggering events is selected from the group consisting of volume of water passed through the device, time the device has been in operation, ion depletion sensing within the device, and pressure differential through the device, and a predetermined time period.

23. The method of claim 19 wherein the second regeneration sequence occurs during a time period of minimal water use.

24. The method of claim 19 further including the step of, with the controller, automatically computing an average amount of water treated on a predetermined day, computing the remaining capacity of the device by subtracting the measured volume of water passed through the water treatment device since the completion of the first regeneration sequence, comparing the remaining capacity with the average amount of water treated on the predetermined day and triggering the second regeneration sequence if the amount of water treated on the predetermined day exceeds the remaining capacity.

* * * * *